(12) United States Patent
Marcus et al.

(10) Patent No.: US 6,295,528 B1
(45) Date of Patent: Sep. 25, 2001

(54) METHOD AND APPARATUS FOR CONVERTING A GEOGRAPHIC LOCATION TO A DIRECT MARKETING AREA FOR A QUERY

(75) Inventors: Kevin Marcus, Redmond; Darrell Garbe, Kirkland, both of WA (US)

(73) Assignee: InfoSpace, Inc., Bellevue, WA (US)

( * ) Notice: Subject to any disclaimer, the term of this patent is extended or adjusted under 35 U.S.C. 154(b) by 0 days.

(21) Appl. No.: 09/201,575

(22) Filed: Nov. 30, 1998

(51) Int. Cl.[7] ........................................... G06F 17/30
(52) U.S. Cl. ................. 707/3; 101/4; 101/5; 101/101; 101/102; 101/104
(58) Field of Search .................... 707/6, 2, 3, 4, 707/10, 101, 102, 104, 205

(56) References Cited

U.S. PATENT DOCUMENTS

| | | | |
|---|---|---|---|
| 5,627,549 | * 5/1997 | Park | 342/357 |
| 5,878,126 | * 3/1999 | Velamuri et al. | 379/219 |
| 5,904,727 | * 5/1999 | Prabhakaran | 701/208 |
| 5,930,474 | * 7/1999 | Dunworth et al. | 395/200.47 |
| 5,963,951 | * 10/1999 | Collins | 707/102 |

* cited by examiner

*Primary Examiner*—Thomas Black
*Assistant Examiner*—Thuy Do
(74) *Attorney, Agent, or Firm*—Christensen O'Connor Johnson Kindness PLLC; Anthony B. Claiborne

(57) ABSTRACT

A method and system are provided for performing database queries with geographic inputs that are converted to a direct marketing area prior to performing the query. Direct marketing areas define geographic locations as discrete areas of interest that may be more useful than city limits or a specific geographic location (e.g., latitude/longitude). Direct marketing areas are more useful geographic designations for purposes of advertising and marketing. A geographic input, such as a city and state, or a latitude and longitude are converted to a direct marketing area. The direct marketing area is then substituted for the entered geographic parameter (e.g., city and state or latitude and longitude), and the requested database query is performed.

18 Claims, 5 Drawing Sheets

METHOD AND APPARATUS FOR CONVERTING A GEOGRAPHIC LOCATION TO A DIRECT MARKETING AREA FOR A QUERY

FIELD OF THE INVENTION

This invention relates generally to databases, and more particularly to geographic database queries that convert a geographic location to a direct marketing area.

BACKGROUND OF THE INVENTION

Database queries are common in today's computing world. Many database queries have geographic locations specified as query criteria, or input parameters. For example, a user may wish to perform a query of a White Pages database to obtain the people named "Smith" located in "Redmond, Wash." A typical database query will simply use "Redmond" and "Wash." directly as query inputs for city and state fields, respectively. The database query will return records of those people living within the city limits of Redmond, Wash.

However, the user may not desire the query to be based on the city limits. An alternative is a query with a range. An example query with a range is to locate all of the database entries that are within a specific distance (e.g., 30 miles) from a specific geographic coordinate. The specific geographic coordinate may be specified directly as a latitude/longitude, or some other geographic coordinate system, or first converted (for example, from a specified city/state), to a specific geographic coordinate. Another query is then performed to obtain all of the records within the specified range from the geographic coordinate Regions known as direct marketing areas have been defined by Nielsen for the continental United States. These areas are based on television signal areas. This division is useful for business people for marketing and advertising purposes.

It is desirable to interject the use of direct marketing areas into database queries with geographic inputs. The present invention is directed to converting a geographic query input to a direct marketing area so as to accomplish this result.

SUMMARY OF THE INVENTION

In accordance with the present invention, a method, apparatus and computer-readable medium for converting a geographic location query input parameter to a direct marketing area, are provided.

In accordance with other aspects of the present invention, a geographic location/direct marketing area database is defined. Defining a geographic location/direct marketing area database may be, simply a reference to an existing database, such as the Nielsen database. The Nielsen database maps a city and a state to a direct marketing area. Geographic location formats, other than city/state, can also be mapped to a direct marketing area, for example, zip code, county, or area code. Defining a geographic location/direct marketing area database can also be accomplished by other methods, such as creating a database that maps geographic coordinates (e.g., latitude and longitude) to direct marketing areas.

In accordance with still other aspects of the present invention, if a query request with a geographic location input is received, the geographic location is converted to a direct marketing area before performing the requested query.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
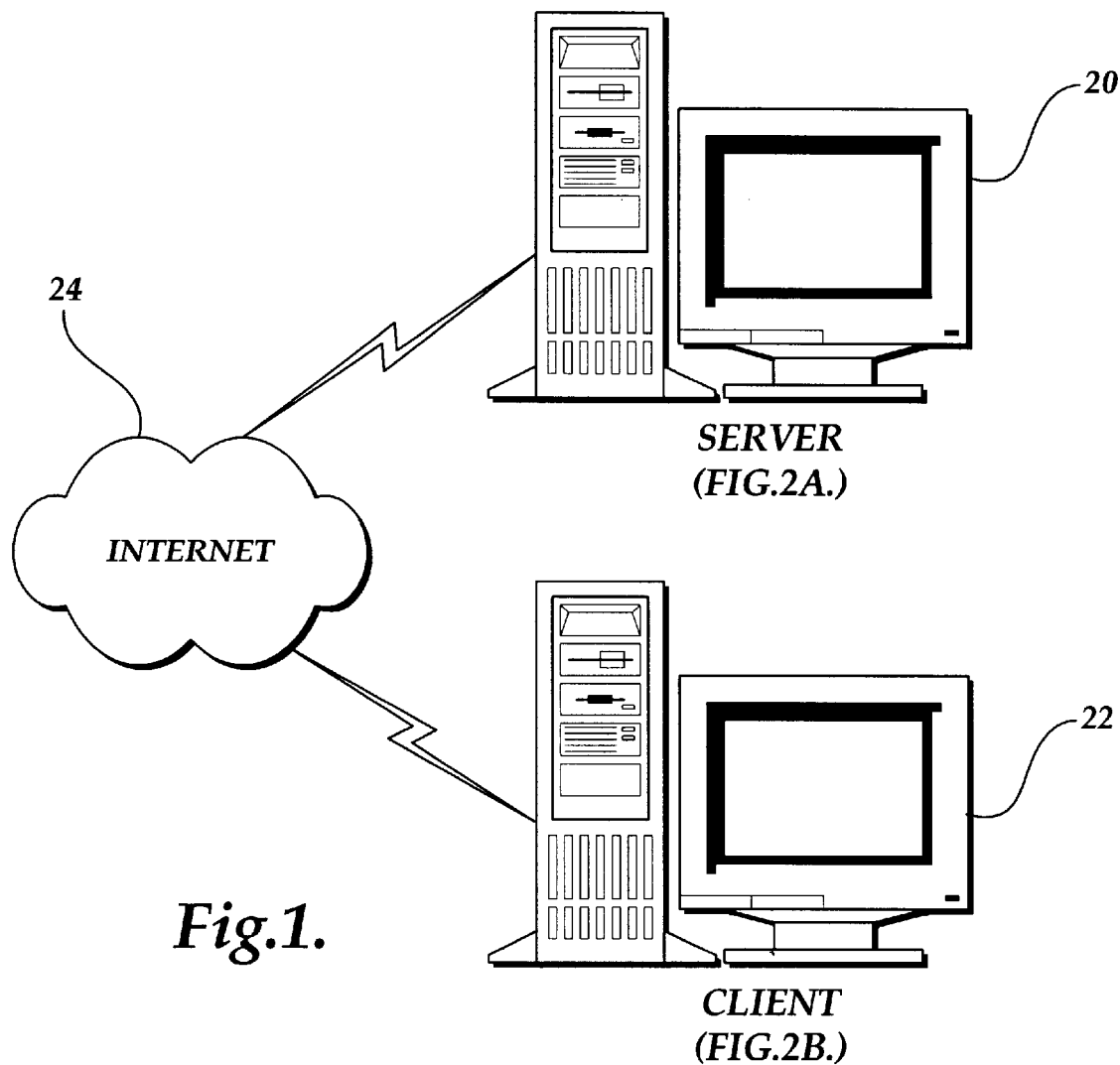
FIG. 1 is a block diagram of a general purpose computer system suitable for converting a geographic location into a direct marketing area, in accordance with the present invention.

FIG. 1 depicts a client/server environment in which the present invention of converting a geographic location query input parameter to a direct marketing area prior to performing a requested query can be implemented. In accordance with the present invention a server 20 receives a query request from a client 22 via the Internet 24. The server 20 performs the requested query, formats the results, and returns them to the query requester, i.e., client 22. The client 22 then displays the results. In the illustrated embodiment, the client is connected to the server via the Internet, however, it will be appreciated that the client 22 may be connected to the server 20 by other means, such as via an intranetwork, or remotely via a modem. The client 22 and server 20 can also be the same computer. Thus, the query request and query can be performed on a stand-alone computer, as well as in a networked environment.

Figure 2A:
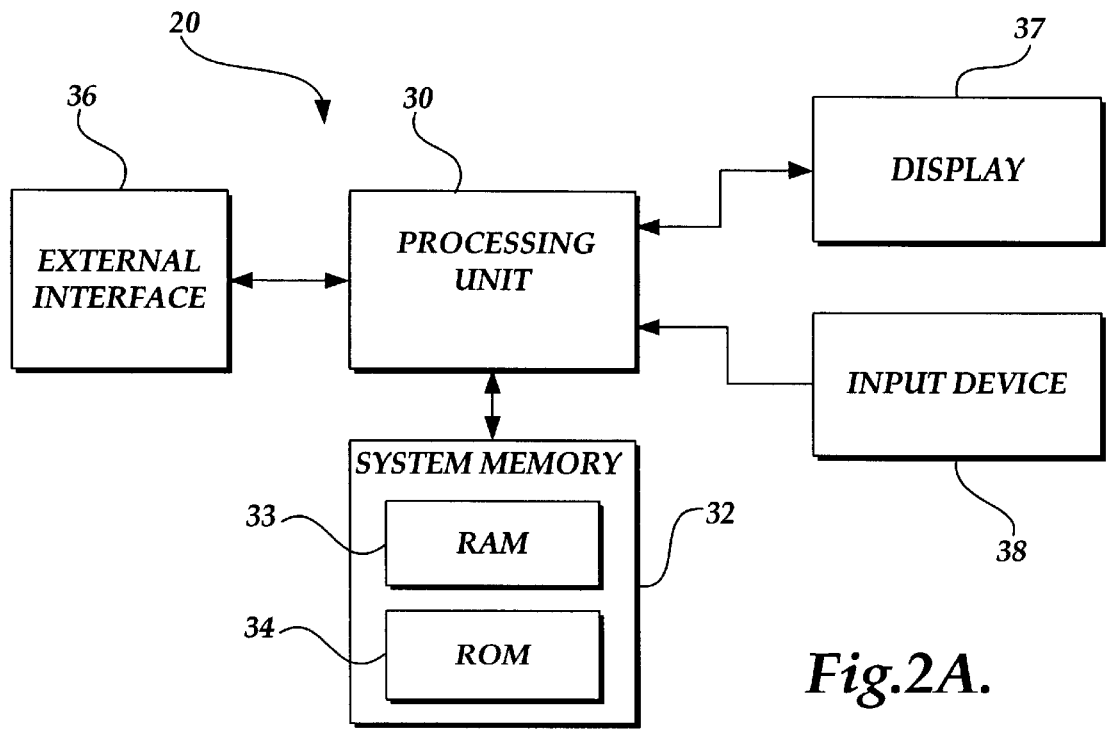
FIG. 2A is a block diagram of the several components of a server illustrated in FIG. 1.

FIG. 2A depicts several of the key components of the server 20 used to implement the present invention. Those of ordinary skill in the art will appreciate that the server 20 includes many more components than those shown in FIG. 2A. However, it is not necessary that all of these generally conventional components be shown in order to disclose an illustrative embodiment for practicing the present invention. As shown in FIG. 2A, the server 20 includes a processing unit 30, a display 37 and system memory 32. System memory 32 generally comprises a random access memory (RAM) 33, read-only memory (ROM) 34, and a permanent mass storage device, such as a hard disk drive, tape drive, optical drive, floppy disk drive, or a combination thereof. The system memory 32 stores the program code and data necessary for converting a geographic input parameter to a direct marketing area prior to performing a requested query in accordance with the present invention.

The server 20 also includes an input device 38 and an external interface 36. The input device 38 may be implemented by a user of the server 20 to input data and default values, for example, defining the geographic location/direct marketing area database. The input device may be of any conventional type such as a keyboard, mouse, track-ball, etc., or some combination thereof. The server 20 communicates to the client 22 through the external interface 36. In one actual embodiment of the present invention, the server is connected to a local area network, which in turn is connected to the Internet. Thus, the external interface 36 comprises a network interface card including the necessary circuitry for such a connection. The external interface 36 is also constructed for use with the Transmission Control Protocol/Internet Protocol (i.e., the standard transmission protocol for the Internet, also known as "TCP/IP"), the particular network configuration of the local area network it is connecting to, and a particular type of coupling medium. In other embodiments of the present invention, the external interface 36 comprises a modem.

Figure 2B:
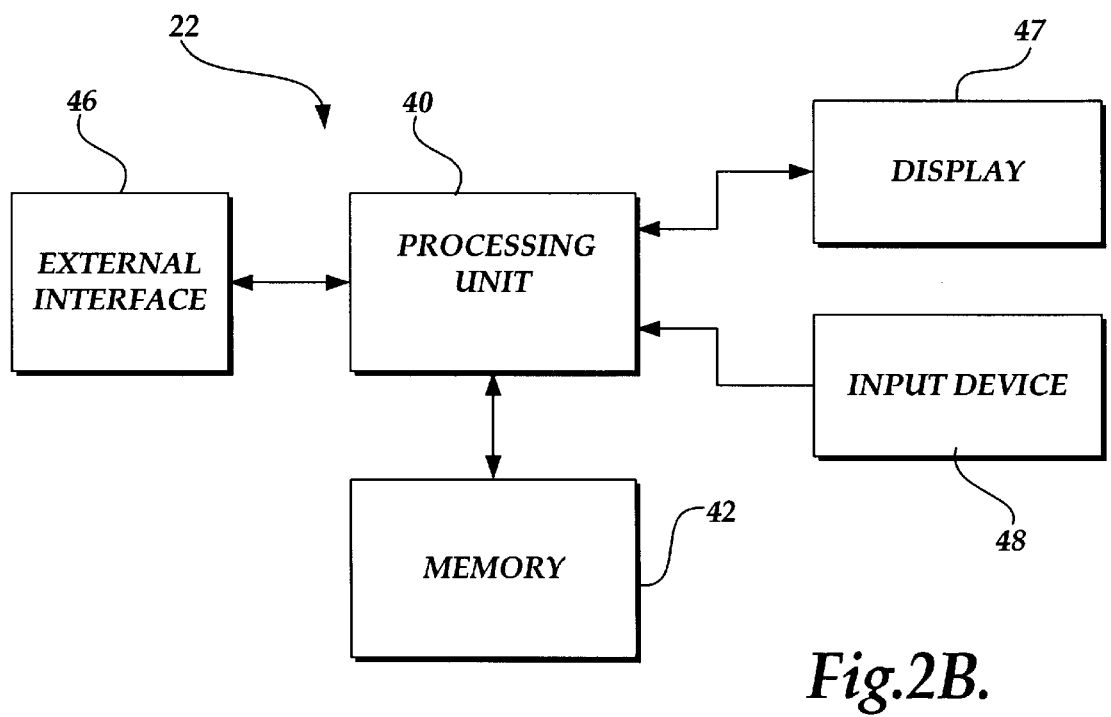
FIG. 2B is a block diagram of the several components of a client illustrated in FIG. 1.

As noted above, the client 22 sends the query request to the server 20, and the server 20 returns the query results to the client via a remote connection established by the external interface 36. The key components of the client 22 used to initiate a query request and display the query results are shown in FIG. 2B. Again, those of ordinary skill in the art will appreciate that the client 22 includes many more components than those shown in FIG. 2B. However, it is not necessary that all of these generally conventional components be shown in order to disclose an illustrative embodiment for practicing the present invention. The client 22 communicates with the server 20 over a remote connection, via an external interface 46. In the actual embodiment of the present invention described herein, the client 22 is connected to a local area network, which in turn, in connected to the Internet. Accordingly, external interface 46 includes the necessary circuitry for such a connection, and is also constructed for use with the TCP/IP protocol, the particular network configuration of a local area network it is connecting to, and a particular type of communication medium. In another embodiment of the present invention, the client's external interface 46 is a modem through which the client 22 may contact the server 20 directly.

In addition to the external interface 46, the client computer 22 includes a display 47, a memory 42 and a processing unit 40. The memory 42 stores the query results provided by the server 20 and the program code implemented by the processing unit 40 for presenting the query results on the display 47, for example, using a web browser.

Finally, the client 22 includes an input device 48, which may be implemented by a user to input the query request. The input device 48 may be of any conventional type, such as a keyboard, mouse, track-ball, etc., or some combination thereof.

A preferred embodiment of the invention is implemented using the Internet. However, it will be appreciated that other embodiments, such as a stand-alone computer are possible. In the Internet embodiment shown and described herein, a user (i.e., client 22 in FIG. 1), initiates a query by entering query parameters in data entry fields displayed on a web page. The query parameters are included as part of a Uniform Resource Locator (URL) that requests information from a world wide web server (e.g., server 20 in FIG. 1). The world wide web server parses the URL to obtain the query parameters, converts a geographic location input parameter to a direct marketing area, performs the requested query using the direct marketing area instead of the geographic location input parameter, and returns the results to the query requester. It will appreciated that the query requester need not be a user in the conventional sense (i.e., person), but may be, for example, a computer software application that automatically generates a query.

Figure 3:
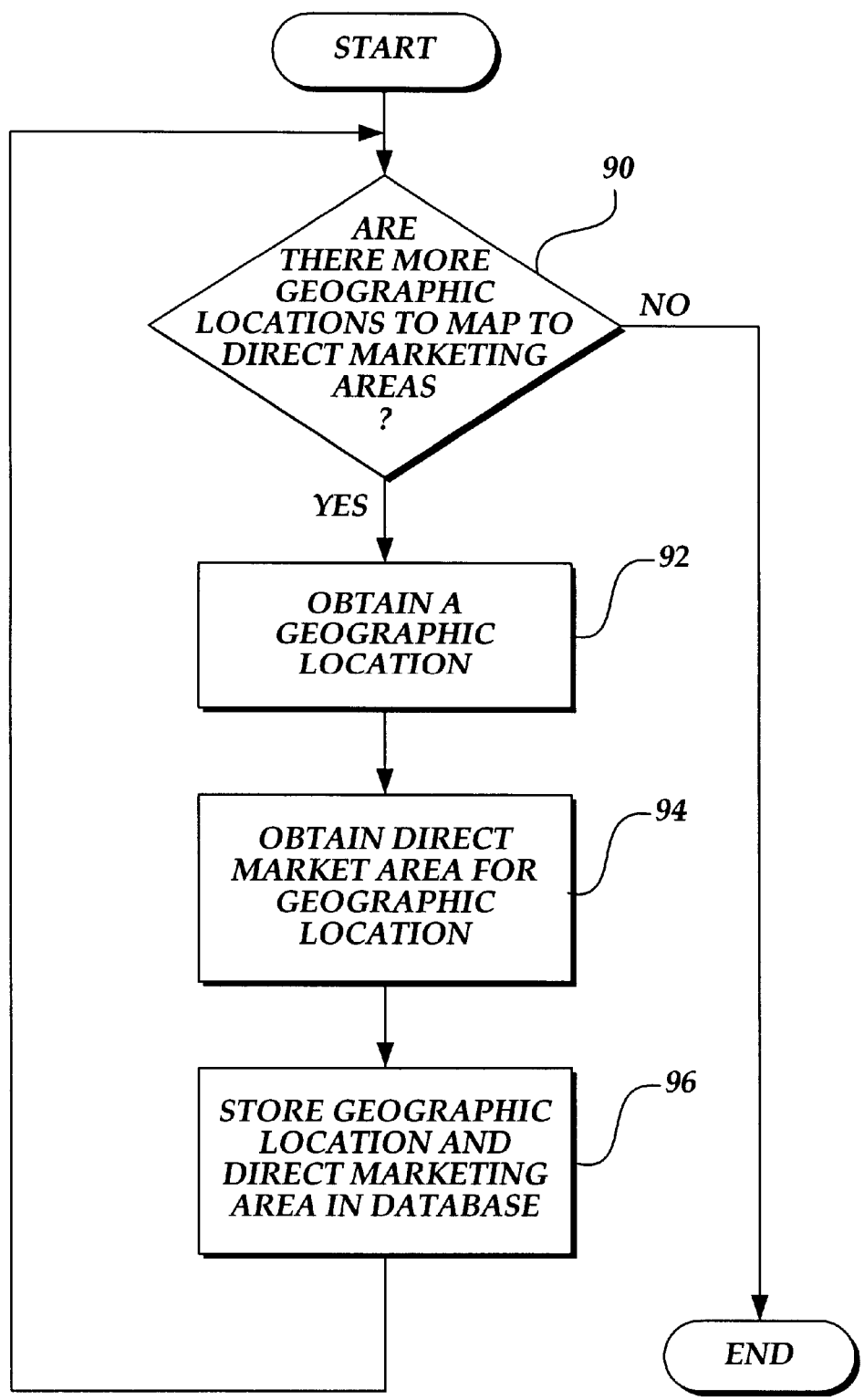
FIG. 3 is a flow diagram illustrating the logic used to define a geographic location/direct marketing area database.

In order to perform a query using a direct marketing area input parameter rather than a specified geographic location input parameter, a database that maps geographic locations to direct marketing areas must exist. In a preferred embodiment of the present invention, a database exists that maps geographic locations of various formats (e.g., city/state, zip code, etc.) to a direct marketing area. Preferably, a commercially available geographic location/direct marketing area database, such as a Nielsen database is used. If, however, a geographic location/direct marketing area database is not available, or is incomplete, one will need to be created or augmented, the logic of which is illustrated in FIG. 3. The logic of FIG. 3 moves from a start block to a decision block 90 where a test is made to determine if there are more geographic locations to map to direct marketing areas. If there are more geographic locations to map to direct marketing areas, the logic moves to a block 92 where a geographic location is obtained. The logic then proceeds to a block 94 where a direct marketing area for the geographic location is obtained. The logic then moves to a block 96 where the geographic location and corresponding direct marketing area are stored in the geographic location/direct marketing area database. It will be appreciated that the geographic location/direct marketing area database can be in various formats, for example a relational database or one or more flat files. The logic then returns to decision block 90 to determine if there are more geographic locations to convert to direct marketing areas. If there are more geographic locations to convert to direct marketing areas, the logic of blocks 92–96 is repeated until it is determined in decision block 90 that there are no more geographic locations to convert to direct marketing areas. When it is determined in decision block 90 that there are no more geographic locations to map to direct marketing areas, the logic of creating or augmenting a geographic location/direct marketing area database ends. In a preferred embodiment of the invention, a Nielsen database is used, in which case, the geographic location/direct marketing area database already exists, and the logic of FIG. 3 need not be performed. However, a reference to the database may need to be provided. It will be appreciated that the geographic location can be in one or more of several formats, for example, a city and a state, or a latitude and a longitude.

Figure 4:
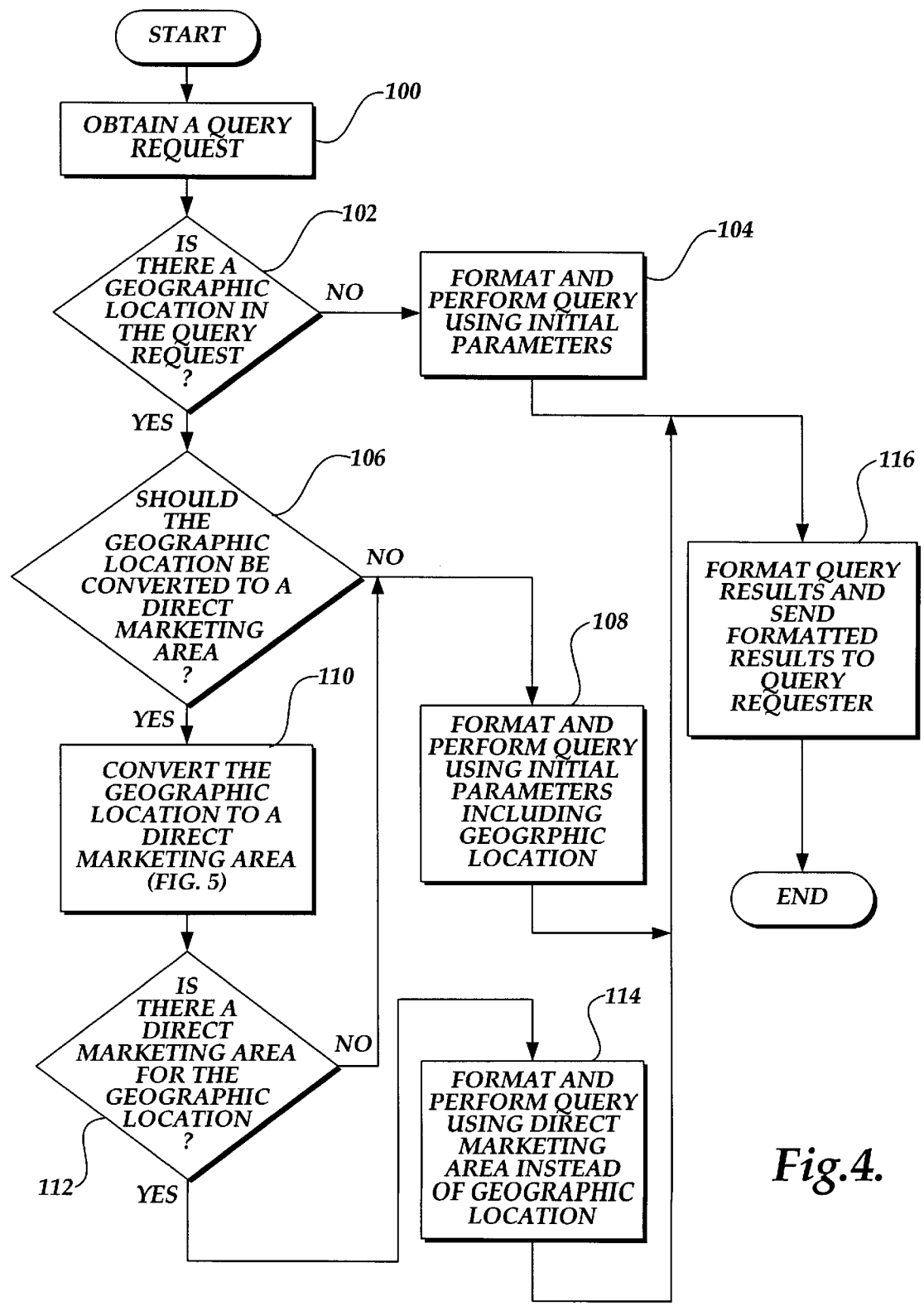
FIG. 4 is a flow diagram illustrating the logic used to process a query request in accordance with the present invention.

FIG. 4 is a flow diagram illustrating the logic of performing a query in accordance with the present invention. The logic of FIG. 4 moves from a start block to a block 100 where a query request is obtained. The logic then proceeds to a decision block 102 where a test is made to determine if there is a geographic location in the query request. If there is not a geographic location in the query request, the logic moves to a block 104 where a query request is formatted and performed using the initial query parameters contained in the query request.

If, however, it was determined in decision block 102 that there is a geographic location in the query request, the logic moves to a decision block 106 where a test is made to determine if the geographic location should be converted to a direct marketing area. In a preferred embodiment of the invention, this determination is based on the type of query. For example, a yellow pages (i.e., query of businesses) would convert a geographic location to a direct marketing area. If it is determined that the geographic location should not be converted to a direct marketing area, the logic moves to a block 108 where a query is formatted and performed using the initial query parameters including the geographic location.

If, however, it is determined in decision block 106 that the geographic location should be converted to a direct marketing area, the logic proceeds to a block 110 where the geographic location is converted to a direct marketing area.

Figure 5:
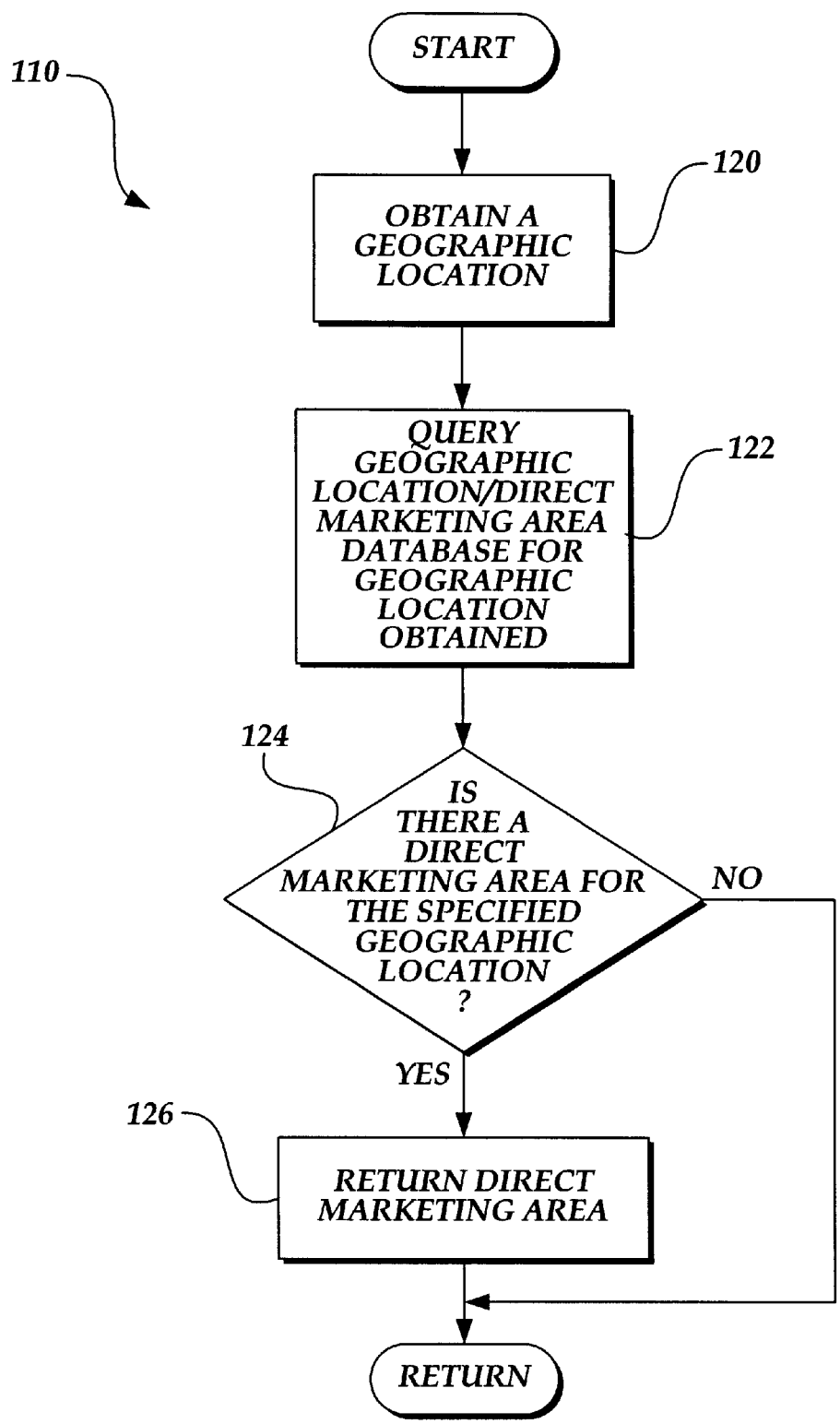
FIG. 5 is a flow diagram illustrating the logic used to convert a geographic location to a direct marketing area.

The logic of converting a geographic location to a direct marketing area 110 is illustrated in detail in FIG. 5. The logic of FIG. 5 moves from a start block to a block 120 where a geographic location is obtained from database query parameters. The geographic location may be in a variety of formats, such as a city/state pair of parameters or a geographic coordinate, such as a latitude and longitude. The logic then moves to a block 122 where a geographic location/direct marketing area database, such as the one defined in FIG. 3, is queried to obtain a direct marketing area for the geographic location specified in the database query request. The logic then proceeds to a decision block 124 where a test is made to determine if there is a direct marketing area for the geographic location obtained. If there is a direct marketing area for the geographic location obtained, the logic proceeds to a block 126 where the direct marketing area is returned. Regardless of whether there is a direct marketing area for the geographic location, the logic of converting a geographic location to a direct marketing area ends, and processing returns to FIG. 4.

Referring to FIG. 4, after a geographic location has been converted to a direct marketing area 110, the logic moves to a decision block 112 where a test is made to determine if there is a direct marketing area for the geographic location (returned in block 126 of FIG. 5). If there is a direct marketing area for the geographic location, the logic proceeds to a block 114 where a query is formatted and performed using the direct marketing area instead of the geographic location. If, however, it is determined in block 112 that there is not a direct marketing area for the geographic location, the logic moves to block 108 where a query is formatted and performed using the initial parameters including a specified geographic location. After the query has been formatted and performed (block 104, 108 or 114), the logic moves to a block 116 where results of the query are formatted and sent to the query requester.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for performing a database query, comprising:
   (a) in response to a query request received from a query requester, the query request containing a geographic location input parameter, determining if a direct marketing area should be used in a query;
   (b) if the direct marketing area should be used in the query, obtaining the direct marketing area corresponding to the geographic location input parameter, if possible; and
   (c) replacing the geographic location input parameter with the direct marketing area, if the direct marketing area for the geographic location input parameter was obtained.

2. The method of claim 1, wherein the direct marketing area is obtained from a geographic location/direct marketing area database containing a plurality of geographic locations and a corresponding direct marketing area for each of the geographic locations.

3. The method of claim 1, further comprising performing the query.

4. The method of claim 3, further comprising:
   (a) formatting a result received from the query performed; and
   (b) sending the formatted result to the query requester.

5. A computer-readable medium having computer executable instructions for performing the method recited in any one of claims 1–4.

6. An apparatus for performing a database query, comprising:
   (a) a processing unit; and
   (b) a storage medium coupled to the processing unit, the storage medium storing program code implemented by the processing unit for:
      (i) in response to a query request received from a query requester, the query request containing a geographic location input parameter, determining if a direct marketing area should be used in a query;
      (ii) if the direct marketing area should be used in the query, obtaining the direct marketing area corresponding to the geographic location input parameter, if possible; and
      (iii) replacing the geographic location input parameter with the direct marketing area, if the direct marketing area for the geographic location input parameter was obtained.

7. The apparatus of claim 6, wherein the direct marketing area is obtained from a geographic location/direct marketing area database containing a plurality of geographic locations and a corresponding direct marketing area for each of the geographic locations.

8. The apparatus of claim 6, wherein the program code implemented by the processing unit further performs the query.

9. The apparatus of claim 8, wherein the program code implemented by the processing unit further:
   (a) formats a result received from the query performed; and
   (b) sends the formatted result to the query requester.

10. A method for performing a database query, comprising:
    (a) in response to a query request received from a query requester, the query request containing a geographic location input parameter, determining if a direct marketing area should be used in a query;
    (b) if the direct marketing area should be used in the query, obtaining the direct marketing area corresponding to the geographic location input parameter, if possible; and
    (c) replacing the geographic location input parameter with the direct marketing area prior to performing the query, if the direct marketing area for the geographic location input parameter was obtained.

11. The method of claim 10, wherein the direct marketing area is obtained from a geographic location/direct marketing area database containing a plurality of geographic locations and a corresponding direct marketing area for each of the geographic locations.

12. The method of claim 10, further comprising performing the query.

13. The method of claim 12, further comprising:
    (a) formatting a result received from the query performed; and
    (b) sending the formatted result to the query requester.

14. A computer-readable medium having computer executable instructions for performing the method recited in any one of claims 10–13.

15. An apparatus for performing a database query, comprising:
    (a) a processing unit; and
    (b) a storage medium coupled to the processing unit, the storage medium storing program code implemented by the processing unit for:

(i) in response to a query request received from a query requester, the query request containing a geographic location input parameter, determining if a direct marketing area should be used in a query;
(ii) if the direct marketing area should be used in the query, obtaining the direct marketing area corresponding to the geographic location input parameter, if possible; and
(iii) replacing the geographic location input parameter with the direct marketing area prior to performing the query, if the direct marketing area for the geographic location input parameter was obtained.

16. The apparatus of claim 15, wherein the direct marketing area is obtained from a geographic location/direct marketing area database containing a plurality of geographic locations and a corresponding direct marketing area for each of the geographic locations.

17. The apparatus of claim 15, wherein the program code implemented by the processing unit further performs the query.

18. The apparatus of claim 17, wherein the program code implemented by the processing unit further:
   (a) formats a result received from the query performed; and
   (b) sends the formatted result to the query requester.

* * * * *